United States Patent [19]

Barth et al.

[11] Patent Number: 4,901,526
[45] Date of Patent: Feb. 20, 1990

[54] BOTTOM UNIT FOR THE COMBUSTION CHAMBER OF A LIQUID-FUELED ROCKET

[75] Inventors: Thomas Barth, Darmstadt; Heinz Keller, Weinheim, both of Fed. Rep. of Germany

[73] Assignee: Firma Carl Freudenberg, Weinheim an der Bergstrasse, Fed. Rep. of Germany

[21] Appl. No.: 300,419

[22] Filed: Jan. 23, 1989

[30] Foreign Application Priority Data

Jan. 27, 1988 [DE] Fed. Rep. of Germany ....... 3802257

[51] Int. Cl.$^4$ .................................................. F02K 9/52
[52] U.S. Cl. ......................................... 60/258; 60/232; 60/257
[58] Field of Search ................. 60/258, 257, 259, 260, 60/232, 39.31, 39.32, 228

[56] References Cited

U.S. PATENT DOCUMENTS

| | | | |
|---|---|---|---|
| 3,016,697 | 1/1962 | Sternberg et al. | 60/258 |
| 3,049,877 | 8/1962 | Sherman | 60/260 |
| 3,138,922 | 6/1964 | Englehart et al. | 60/232 |
| 3,140,584 | 7/1964 | Ritchey et al. | 60/232 |
| 3,145,530 | 8/1964 | Sobey | 60/232 |
| 3,159,969 | 12/1964 | Ernst et al. | 60/232 |
| 3,280,563 | 10/1966 | Bowersett | 60/232 |

Primary Examiner—Donald E. Stout
Attorney, Agent, or Firm—Karl F. Milde, Jr.

[57] ABSTRACT

A bottom unit for the combustion chamber of a liquid-fueled rocket including a bottom plate held on a swivel bearing and having circumferentially distributed openings for the injection of the two fuel components as well as two separate groups of supply passages which are connected to these fuel injection openings. The swivel bearing consists of a rigid thrust plate and a rigid hanger plate which are held and joined together by an internally situated, first annular body of rubber elastic material and by a second annular body of rubber elastic material surrounding the first at a radial distance therefrom. The one group of supply passages is formed by the cavity surrounded by tthe first annular body and the other group of supply passages by the annular space between the first and the second annular body.

12 Claims, 2 Drawing Sheets

BOTTOM UNIT FOR THE COMBUSTION CHAMBER OF A LIQUID-FUELED ROCKET

BACKGROUND OF THE INVENTION

The invention relates to a bottom unit for the combustion chamber of a liquid-fueled rocket. The bottom unit includes a bottom plate held on a swivel bearing which can be turned about an axis normal to the longitudinal axis of the rocket. The bottom unit has circumferentially distributed openings for the injection of the two fuel components. Two separate groups of supply passages are connected to the fuel injection openings to provide the liquid fuel.

A rocket bottom unit of this general type is well known. The swivel bearing contained therein is a Cardan-joint and is more or less surrounded externally by the fuel component supply lines constituted by hoses. The overall structure of the bottom unit is accordingly complicated and difficult.

SUMMARY OF THE INVENTION

It is a principal object of the present invention to improve a rocket bottom unit of the above described type such that the overall structure will be simpler.

This object, as well as other objects which will become apparent from the discussion that follows, are achieved, according to the present invention, by constructing the pivot of the bottom unit in the following manner:

The swivel bearing comprises a rigid thrust plate and a rigid hanger plate which are supported and fastened to one another by an internally located, first, inner annular body of rubber elastic material and a second, outer annular body of rubber elastic material surrounding the first annular body with a radial space. The one group of supply passages are formed by the cavity surrounded by the first annular body and the other group of supply passages are formed by the annular space between the first and second annular bodies. The supply passages are thus integrated into the swivel bearing eliminating the need for hoses and giving the overall design not only substantially greater functional clarity but also greater simplicity. In addition to a reduction of the height that has heretofore been required, it also becomes possible to facilitate the quick assembly of the bottom unit containing all of the functionally necessary components on the planar bottom of a liquid-fueled rocket. This feature is of great advantage in case of repair or a change in the rocket specifications.

Furthermore, the available flow cross section of the supply passages for the two fuel components is substantially increased in the space immediately preceding the injection orifices. This factor, taken in conjunction with the direct routing, contributes to the assurance of precisely defined and identical conditions of flow in the orifices. This results in an especially uniform burn in the combustion chamber.

Furthermore, the annular bodies consisting of a rubber-elastic material produce a high degree of damping of the pulsating pressure changes produced in the supply lines as a result of the operation of the rocket. This too has a positive effect on the smoothness of burn in the combustion chamber. Such pulsating pressure changes can be due, for example, to backfiring in the combustion chamber. The isolation of the vibration of the combustion chamber from the rocket is substantially improved.

To assure a directionally neutral swiveling of the combustion chamber, it has been found to be advantageous for the first and second annular bodies to surround one another concentrically. Such swiveling movements serve to steer the rocket. They are generally limited to tilting the combustion chamber by less than about seven degrees about the center of rotation that is located along the central longtitudinal axis.

For steering the rocket it is of great advantage if the center of rotation about which the combustion chamber is swivelled is subjected to little or no lateral displacement while performing the swiveling movement. To achieve this objective it has been found to be desirable to construct the surfaces of the second annular body, which are in contact with the thrust and hanger plates, respectively, to have surface normals which intersect the center of rotation. At the same time aforementioned the contact surfaces should be approximately parallel. In applications in which the necessary steerability of the combustion chamber is less than approximately four degrees, these surfaces can have the shape of the periphery of truncated cones.

The production of such contact surfaces is accordingly easy to achieve. In applications in which a greater swiveling of the bottom units of the rocket is desired, it has been found advantageous for the contact surfaces to have a spherical profile centered on the center of rotation.

The center of rotation is best disposed on the center line of the combustion chamber in the vicinity of its thrust-transferring surface, in which case a slight vertical distance from the bottom surface can be provided, if desired. Even under the conditions of the thrust produced on the bottom surface of the combustion chamber by launching the rocket, the center of rotation will not undergo any disturbing lateral displacement.

According to an advantageous embodiment, at least the second annular body is provided with at least one reinforcing or stiffening insert disposed between the thrust plate and hanger plate. Preferably, this insert has a hollow conical profile or a spherical profile, as required. The optimum is achieved, when the surface normals pass through the center of rotation. Undesirable deformations of the annular body can thus be suppressed and, consequently, the center of rotation of the swivel will remain in a stable position under severe operating conditions.

The tilt angle of the combustion chamber can be increased but permanent deformation of the annular bodies can be avoided if a plurality of such stiffening inserts are used in the latter and are sandwiched together. Particularly good properties are obtained in this respect if the layers of the second annular body which consist of rubber elastic material are of relatively small thickness perpendicular to the direction of the contact surfaces. The ability of the bottom unit to tilt is accordingly also slight and can be increased if necessary by increasing the number of successive layers.

The stiffening insert—it is best to use several inserts, alternating always with layers of a respective annular body—can be brought close to the exposed inner and/or outer surface of the annular body and covered by the latter while avoiding any appreciable unevenness of such surfaces. Any corrosive attack on the stiffening insert by the fuel components is thus prevented.

The stiffening insert must be of such a nature that only those deformations of the annular bodies are prevented which can produce an undesirable shift of the center of rotation.

From this point of view it is basically sufficient to use any tension-resistant material for the stiffening inserts which surrounds the center of rotation in the area of the annular bodies at a uniform distance therefrom.

It is difficult, however, to be certain of this desired configuration when flexible materials are used. Therefore, it is a preferred feature of the present invention to use stiffening inserts which consist of sheet metal or fiber-reinforced plastic, and to bond the thrust plate and the hanger plate to adjacent portions of the annular bodies by adhesion, for example by direct vulcanization.

The annular body layers adjoining both sides of the stiffening insert are to have a greater width in the direction of the maximum dimension of the profile of the stiffening insert than perpendicular to this direction, preferably a width that is three to twenty times as great as perpendicular to this direction. The stability of the position of the center of rotation of the swivel bearing and hence the steerability of the rocket is especially good in this case.

The preferred embodiment of the present invention will now be described with the aid of the accompanying drawing.

BRIEF DESCRIPTION OF THE DRAWING

The FIG. 1 shows in detail a longitudinal section of the transition region between a liquid-fueled rocket and a corresponding combustion chamber.

The FIG. 2 shows a sectional detail of FIG. 1.

DESCRIPTION OF THE PREFERRED EMBODIMENT

Figure 1:
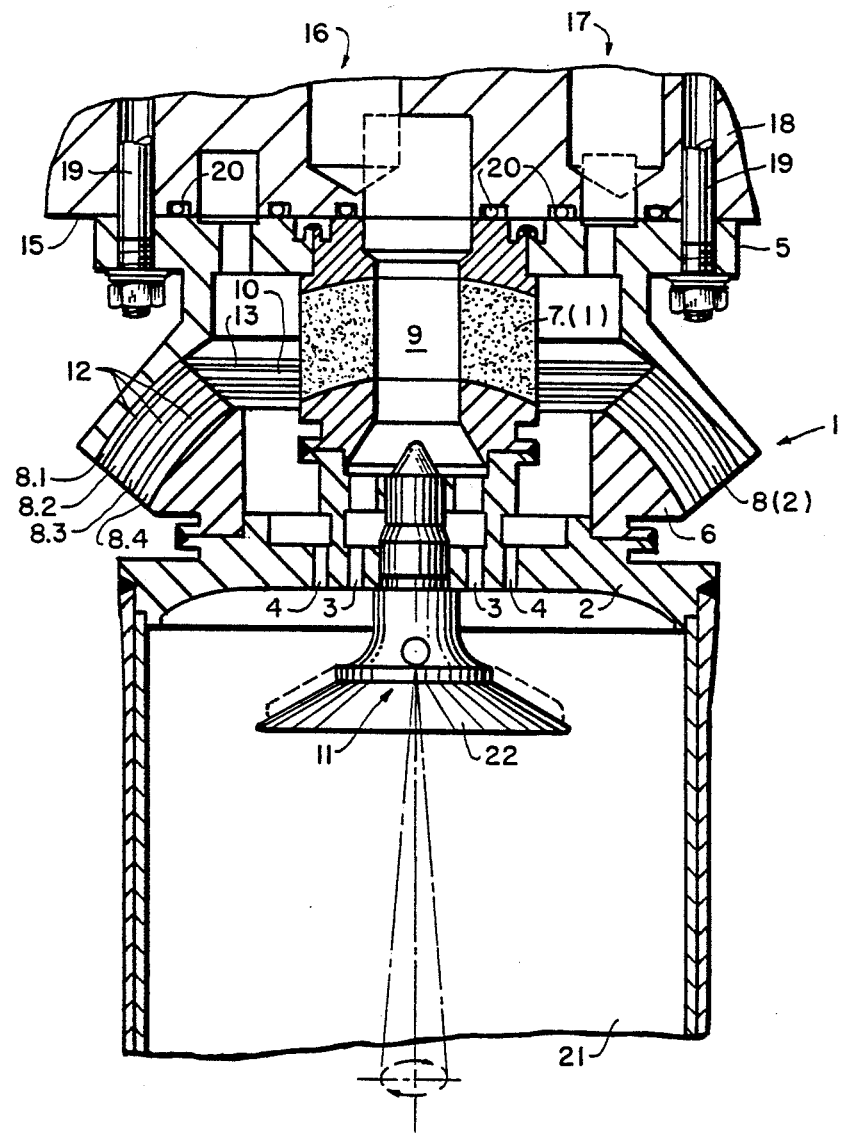
Figure 2:
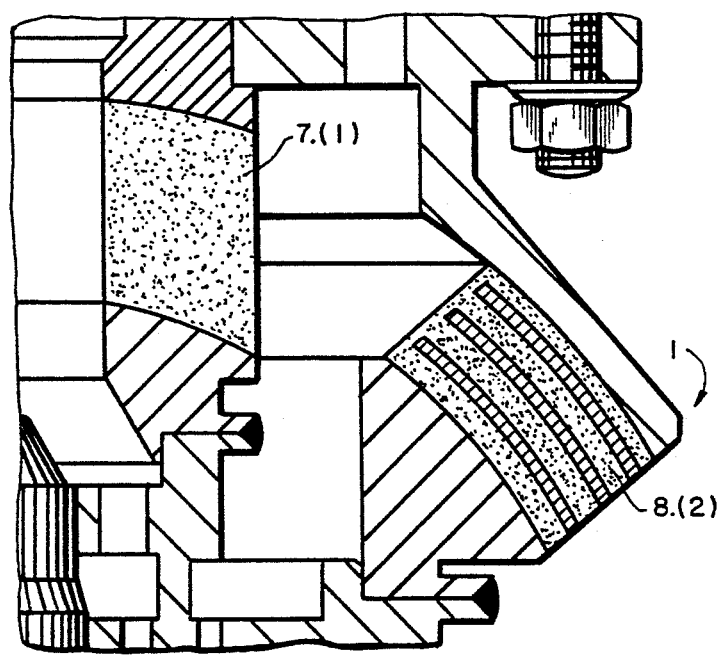

A liquid-fueled rocket 18 is defined at the bottom by a flat surface 15 from which mounting bolts 19 project perpendicularly downward. These bolts serve to clamp a bottom unit against the flat surface, while compressing O-rings 20 that seal supply passages 16 and 17 of the two fuel components from one another and from the environment.

The O-rings are contained in circumferential grooves which interrupt the flat surface 15 of the rocket 18.

The bottom unit consists essentially of a swivel bearing 1 and a combustion chamber 21 which is pivotally supported by the bearing on the flat surface 15 of the rocket 18.

The preferred embodiment of the swivel bearing 1 will initially be described. It comprises a thrust plate 5 and a hanger plate 6 which are supported and joined to one another by a first, inner annular body 7 of rubber elastic material and a second annular body 8 of rubber elastic material surrounding the first annular body at a radial distance. The surfaces in mutual contact between the two annular bodies 7 and 8 on the one hand, and the thrust plate and hanger plate 5, 6 on the other, are spherically curved about a common center of rotation 11. This center is disposed at the center of the base of the combustion chamber 21.

Furthermore, several stiffening inserts 12 are embedded in the second annular body 8, which are at a substantially uniform distance from one another and from the associated contact surfaces of the thrust plate 5 on the one hand and the hanger plate 6 on the other. The resulting layers 8.1, 8.2 ... 8.n of the second annular body have a substantially greater width parallel to the direction of the stiffening inserts than perpendicular to this direction. The ratio in question amounts in the present case to about seven to ten. A ratio in the range of five to twelve assures, even in critical operating conditions, a relatively stable location of the center 11 while providing an effective means for steering the rocket. The stiffening inserts 12 preferably consist of sheet steel or fiber reinforced plastic.

In the underside region, the bottom plate 2 of the combustion chamber 21 is fastened together with the hanger plate 6. The bottom plate 2 contains openings or orifices for the injection of the two fuel components. These openings are evenly distributed in the circumferential direction and their supply passages are interconnected in the one case by the cavity 9 of the first annular body 7 and in the other case by the space 10 between the first annular body 7 and the second annular body 8. They are thus connected to the supply passages 16 and 17, respectively, for the two fuel components.

The conditions of flow and pressure are therefore completely equalized in all the injection openings 3 for one fuel component and in all the injection openings 4 for the other fuel component.

They assure an especially smooth combustion in the combustion chamber 21. Also the uniform mixing of the two components as they strike the back of the conically shaped spreader 22 is important in this regard. The resulting vibrations of the combustion chamber caused by the combustion are isolated from the rocket in a satisfactory manner.

There has thus been shown and described a novel bottom unit for the combustion chamber of a liquid-fueled rocket which fulfills all the objects and advantages sought therefor. Many changes, modifications, variations and other uses and applications of the subject invention will, however, become apparent to those skilled in the art after considering this specification and the accompanying drawing which disclose the preferred embodiment thereof. All such changes, modifications, variations and other uses and applications which do not depart from the spirit and scope of the invention are deemed to be covered by the invention which is limited only by the claims which follow.

What is claimed is:

1. In a bottom unit for the combustion chamber of a liquid-fueled rocket, including (a) a bottom plate held on a swivel bearing, which can be tilted about a center of rotation with respect to the longitudinal direction of the liquid-fueled rocket and which has circumferentially distributed injection openings for two fuel components, and (b) two separate groups of fuel supply passages connected to the injection openings, the improvement wherein the swivel bearing includes a rigid thrust plate and a rigid hanger plate supported and fastened to one another by an internally located first annular body of rubber elastic material and a second annular body of rubber elastic material surrounding the first annular body and spaced radially therefrom, and wherein one group of supply passages is formed by the cavity surrounded by the first annular body and the other group of supply passages is formed by the space between the first annular body and the second annular body.

2. The bottom unit in accordance with claim 1, wherein the first annular body and the second annular body concentrically surround one another.

3. The bottom unit in accordance with claim 2, wherein the mutual contact surfaces of at least the second annular body on the one hand and the thrust plate and hanger plate on the other have a surface normal which intersects said center.

4. The bottom unit in accordance with claim 3, wherein said contact surfaces extend parallel to one another.

5. The bottom unit in accordance with claim 4, wherein said contact surfaces each have the form of the periphery of a truncated cone.

6. The bottom unit in accordance with claim 4, wherein said contact surfaces each have a spherical profile curved around said center.

7. The bottom unit in accordance with claim 1, wherein said center is disposed in the vicinity of the base of the combustion chamber and is disposed centrally in said combustion chamber.

8. The bottom unit in accordance with claim 3, wherein at least the second annular body is provided with at least one stiffening insert disposed between the thrust plate and the hanger plate and extending substantially parallel to said contact surfaces.

9. The bottom unit in accordance with claim 8, wherein said stiffening insert extends outward close to the lateral surfaces of the second annular body and is overlapped by the latter in such a manner as to avoid any appreciable unevenness of said lateral surfaces.

10. The bottom unit in accordance with claim 8, wherein said stiffening insert is made of a material selected from the group consisting of sheet metal and a fiber-reinforced plastic.

11. The bottom unit in accordance with claim 8, wherein the layers of the second annular body that bilaterally adjoin said stiffening insert have a greater width parallel to the direction of the profile of said stiffening insert than perpendicular to this direction.

12. The bottom unit in accordance with claim 11, wherein said layers have three to twenty times the size parallel to the direction of the profile of said stiffening insert than perpendicular to this direction.

* * * * *